United States Patent [19]

Ichijo

[11] 4,317,804

[45] Mar. 2, 1982

[54] PROCESS FOR THE SELECTIVE REMOVAL OF FERRIC ION FROM AN AQUEOUS SOLUTION CONTAINING FERRIC AND OTHER METAL IONS

[75] Inventor: Michio Ichijo, Sakura, Japan

[73] Assignee: Director-General of Agency of Industrial Science and Technology, Tokyo, Japan

[21] Appl. No.: 241,635

[22] Filed: Mar. 9, 1981

[30] Foreign Application Priority Data

Jun. 26, 1980 [JP] Japan .................................. 55/87078

[51] Int. Cl.$^3$ ............................................. C01G 49/02
[52] U.S. Cl. .................................... 423/139; 423/140; 423/150; 423/DIG. 14; 210/634; 210/638; 210/639; 210/912
[58] Field of Search ......... 423/139, 140, 150, DIG. 4, 423/DIG. 16; 210/634, 638, 639, 663, 912

[56] References Cited

U.S. PATENT DOCUMENTS

| | | | |
|---|---|---|---|
| 3,586,477 | 6/1971 | Flood | 210/638 |
| 3,876,748 | 4/1975 | Roorda | 423/140 |
| 3,966,569 | 6/1976 | Reinhardt | 423/139 |
| 4,029,733 | 6/1977 | Faugeras | 423/140 |

OTHER PUBLICATIONS

Fletcher et al., in *Bulletin of the Institution of Mining and Metallurgy*, No. 693, Aug. 1964, pp. 765–777.

*Primary Examiner*—Brian E. Hearn
*Attorney, Agent, or Firm*—Stephen F. K. Yee

[57] ABSTRACT

A process for treating an aqueous acidic solution containing a large amount of ferric ion and other metal ions such as a hydrochloric acid solution of manganese nodules, which includes contacting the aqueous solution with an organic extractant to selectively extract the ferric ion therefrom. The extractant is comprised of a dialkylphosphoric acid having 6–12 carbon atoms and a hydrocarbon solvent such as kerosene. The aqueous phase obtained after the extraction is then added with a pH-controlling agent to increase the pH thereof to a value so that unextracted ferric ion remaining therein may precipitate as ferric hydroxide while the other metal ions may be prevented from precipitating. Solid-liquid separation of the resulting mixture gives a solution having a ferric ion concentration of about 0.1 g/l or less. The pH-controlling agent is preferably an industrial waste containing a metal oxide or hydroxide such as a sludge from plating industries. By repeating the above procedure, a substantially ferric ion-free solution may be obtained.

11 Claims, No Drawings

PROCESS FOR THE SELECTIVE REMOVAL OF FERRIC ION FROM AN AQUEOUS SOLUTION CONTAINING FERRIC AND OTHER METAL IONS

BACKGROUND OF THE INVENTION

This invention relates to a process for treating an aqueous solution containing ferric and other metal ions for selectively removing the ferric ion.

When ferric ion is intended to be selectively separated from an acidic solution containing various metal ions, a neutralising agent such as calcium carbonate or calcium hydroxide is generally added to the acidic solution to selectively precipitate the ferric ion as ferric hydroxide. This method is, however, not applicable to an acidic solution having a high ferric ion concentration such as a hydrochloric acid solution of manganese nodules, because colloidal ferric hydroxide is produced in such a large amount that a solid-liquid separation is inhibited. Moreover, this method when applied to a large scale treatment, is disadvantageous from economic point of view because the neutralising agent is not available at a low cost.

Recent trend of metal refining industries is towards hydro-metallurgy in favor of its decreased energy consumption. Thus, there is a great demand to develop a simple and economical process for removing ferric ion from acidic aqueous solutions containing various metal ions, which removal is indispensable to selectively recover desired metals therefrom.

SUMMARY OF THE INVENTION

It is, therefore, an object of the present invention to provide a process which can selectively and completely separate ferric ion from a solution containing a large quantity of ferric ion and various other metal ions.

Another object of the present invention is to provide a simple and economical process for treating a ferric ion-containing aqueous solution, especially a hydrochloric acid solution of manganese nodules, for selectively removing the ferric ion therefrom.

A further object of the present invention is to provide a process which permits the use of industrial wastes, such as sludges from plating industries, for the removal of ferric ion from an aqueous solution of the above-mentioned type.

In accomplishing the foregoing objects, there is provided in accordance with the present invention a process for treating a ferric ion-containing aqueous solution for the removal of ferric ion, which includes the steps of:

(a) contacting the ferric ion-containing aqueous solution with an organic extractant including a dialkylphosphoric acid having 6 to 12 carbon atoms and a hydrocarbon solvent to extract the ferric ion therefrom, thereby obtaining an organic phase containing the extracted ferric component and an aqueous phase containing residual unextracted ferric ion;

(b) separating the aqueous phase from the organic phase;

(c) mixing the aqueous phase with a pH-controlling agent to increase the pH thereof to a value sufficient to precipitate at least a part of the residual ferric ion as ferric hydroxide; and (d) separating the mixture from step (c) into a solid phase and a liquid phase.

Preferably, the pH-controlling agent is an ore or an industrial waste containing metal oxides or hydroxides, such as a sludge from plating industries.

Other objects, features and advantages of the present invention will become apparent from the detailed description of the invention to follow.

DETAILED DESCRIPTION OF THE INVENTION

Ferric ion-containing aqueous solution to be treated in accordance with the process of the present invention has, generally, a ferric ion content of 5–100 g/l and a pH value of 0–2 and contains one or more metal ions other than ferric ion. Examples of such aqueous solutions include a hydrochloric acid solution of manganese nodules (ferric ion concentration: about 10–50 g/l) and a solution obtained by treating manganese nodules for leaching with a waste pickle liquor (ferric ion concentration: about 10–50 g/l).

In the first step of the process of this invention, the aqueous acidic solution is contacted with an organic extractant to selectively extract as much ferric ion as possible therefrom (step (a)). The extractant comprises a hydrocarbon solvent and a dialkylphosphoric acid having 6–12 carbon atoms.

The content of the dialkylphosphoric acid in the extractant is 5–50% by volume. Di-2-ethylhexylphosphoric acid is easily commercially available and, therefore, the use thereof as the extractant is preferable. The amount of the extractant used depends on the concentration of the ferric ion in the aqueous solution to be treated and the concentration of the dialkylphosphoric acid in the extractant. Generally, the extractant is used in an amount of 0.1 to 10 parts by volume per one part by volume of the aqueous solution to be treated.

Extraction of ferric ion from the aqueous solution is considered to proceed according to the following chemical equation:

$$Fe^{3+} + 3R.H \rightleftharpoons R_3.Fe + 3H^+ \quad (1)$$

where R.H stands for a dialkylphosphoric acid. Thus, the organic phase after step (a) contains the extracted ferric component. On the other hand, the aqueous phase contains a small amount of residual, unextracted ferric ion and substantially all of the other metal ions and has a higher activity than the aqueous solution prior to step (a).

In the next step, the organic phase is separated from the aqueous phase (step (b)). If desired, the extraction and separation steps (steps (a) and (b)) may be repeated twice or more times. It is preferred that the extraction be conducted until the concentration of ferric ion in the aqueous phase becomes about 1 g/l or less.

The ferric component-containing organic phase obtained in step (b) may be treated with 6–8 N hydrochloric acid to extract the ferric component. The thus regenerated organic phase may be recycled to step (a) for use as the extractant.

The aqueous phase from step (b) is then added with a pH-controlling agent to increase the pH thereof to a value sufficient to precipitate at least a part of the residual unextracted ferric ion remaining in the aqueous phase as ferric hydroxide (step (c)).

Although the pH control can be achieved with the use of sodium hydroxide, calcium carbonate or other alkaline materials, it is preferable to use an industrial waste containing a metal oxide or oxides capable of being dissolved in acidic aqueous solution and of increasing the pH thereof. Illustrative of the wastes are sludges from various plating industries containing one or more metal hydroxides such as copper hydroxide, nickel hydroxide and zinc hydroxide, and dusts from metal refining steps containing one or more metal oxides such as copper oxide, lead oxide and zinc oxide. Further, ores such as copper oxide ores, manganese oxide ores and zinc oxide ores may be advantageously used as the pH-controlling agent. The wastes and ores may serve to function not only as pH-controlling agent but also as a part of the source or raw material of metals to be recovered. Therefore, the use of them is very advantageous because they are available at low economic prices and because the yield of the metals will be increased as much.

In step (c), the pH-controlling agent is added in an amount so that the residual ferric ion remaining in the aqueous phase may be precipitated as much as possible while preventing the precipitation of the other metal ions. Generally, the pH of the aqueous phase is controlled in step (c) to about 1.5–3.

Preferably, the mixture obtained by the addition of the pH-controlling agent to the aqueous phase is maintained at a temperature of 50°–100° C., preferably 80°–95° C., under stirring for 30–60 min. so as to accelerate the reactions and to make the subsequent solid-liquid separation easy.

The resulting mixture obtained in step (c) is then separated into a solid phase and a liquid phase by, preferably, filtration (step (d)). Since the amount of the residual ferric ion in the aqueous phase subjected to the previous pH-controlling step (c) is small, the amount of the ferric hydroxide is small. Therefore, the solid-liquid separation may be performed without difficulties.

Meanwhile, the pH-controlling agent used in step (c) may contain matters insoluble in acidic aqueous solution. Such insoluble matters can be separated in step (d) together with the ferric hydroxide. Thus, the process of this invention permits the use of a variety of industrial wastes as long as they contain acid-consuming components and do not produce substances which inhibit solid-liquid separation.

The liquid phase resulting from step (d) has a ferric ion concentration of 0.1 g/l or less. If necessary, the liquid phase may be subjected to the treatment of steps (a) through (d) again. By this repetition, it is possible to obtain a substantially ferric ion-free liquid phase. The liquid phase is then subjected to a further treatment for the selective recovery of respective metals. This can be done by any known ways. However, this is beyond the scope of the present invention and no description is herein made.

The following example will further illustrate the present invention.

EXAMPLE

An acidic aqueous solution obtained by dissolving manganese nodules in conc. hydrochloric acid was subjected to the treatment according to the present invention. The aqueous solution contained 35 g/l of ferric ion, 30 g/l of ferrous ion, 0.5 g/l of cupric ion, 0.7 g/l of nickel ion, 0.1 g/l of cobalt ion and 18 g/l of manganese ion and had a pH value of 0.1.

The aqueous solution was first added with an organic extractant containing 40% by volume of di-2-ethylhexylphosphoric acid and 60% by volume of kerosene, in a by volume ratio of the extractant to the aqueous solution of 5:1. After vigorous shaking for extraction, the aqueous phase was separated from the organic phase. The aqueous phase was found to contain 5 g/l of ferric ion and 20 g/l of ferrous ion and to have a pH of below 0.

The above solvent extraction was repeated once more for the thus obtained aqueous phase with an extractant to aqueous phase ratio of 5:2, whereby to obtain a second aqueous phase having a ferric ion concentration of 1 g/l, a ferrous ion concentration of 20 g/l and a pH value of below 0. An analysis of the second aqueous phase revealed that there was no noticeable change in concentrations of copper, nickel, cobalt and manganese throughout the extraction.

The second aqueous phase was then added with a plating sludge containing 1.00 wt % of Na, 2.50 wt % of Mg, 6.81 wt % of Ca, 12.00 wt % of Cr, 0.70 wt % of Fe, 6.10 wt % of Ni, 11.10 wt % of Cu, 2.70 wt % of Zn, 0.29 wt % of Al and 4.10 wt % of $SiO_2$, in an amount of 0.25 Kg per one liter of the second aqueous phase. The mixture was then heated to 90° C. and maintained at that temperature for 30 min. with stirring. Thereafter, the solid phase was filtered off to obtain a third liquid phase having a pH value of 1.5, a ferric ion concentration of 0.1 g/l and a ferrous ion concentration of 15 g/l. The filtration was able to be effected with ease.

The third aqueous phase was further subjected to a solvent extraction in the same manner as above with an extractant to aqueous phase ratio of 5:2 (vol/vol) to obtain a fourth aqueous phase having a pH value of 0.8, a ferric ion concentration of 0.1 g/l and a ferrous ion concentration of 13 g/l.

The fourth aqueous phase was added with the sludge in an amount of 0.1 Kg per liter of the fourth aqueous phase and the mixture was maintained at 90° C. for 30 min. under stirring. A solid-liquid separation of the mixture gave a fifth aqueous phase having a pH value of 2.5 and a ferrous ion concentration of 10 g/l. No ferric ion was detected.

The ferric component-containing organic extractant obtained after the above extraction procedures was treated with 6–8 N of hydrochloric acid to remove the ferric component by extraction. The thus regenerated extraction was able to be reused for extraction purpose.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

I claim:
1. A process for treating a ferric ion-containing aqueous solution for the removal of ferric ion, comprising the steps of:
   (a) contacting the ferric ion-containing aqueous solution with an organic extractant comprising a dialkylphosphoric acid having 6 to 12 carbon atoms and a hydrocarbon solvent to extract the ferric ion therefrom, thereby obtaining an organic phase containing the extracted ferric component and an aqueous phase containing residual unextracted ferric ion;
   (b) separating said aqueous phase from said organic phase;

(c) mixing said aqueous phase with a pH-controlling agent to increase the pH thereof to a value sufficient to precipitate at least a part of the residual ferric ion as ferric hydroxide; and (d) separating the mixture from step (c) into a solid phase and a liquid phase.

2. A process as set forth in claim 1, wherein the content of said dialkylphosphoric acid in said organic extractant is between 5 and 50% by volume.

3. A process as set forth in claim 1, wherein said extractant is used in an amount of 0.1 to 10 parts by volume per one part by volume of said ferric ion-containing aqueous solution.

4. A process as set forth in claim 1, wherein said dialkylphosphoric acid is di-2-ethylhexylphosphoric acid.

5. A process as set forth in claim 1, wherein steps (a) and (b) are conducted until the concentration of ferric ion in the aqueous phase becomes about 1 g/l or less.

6. A process as set forth in claim 1, wherein said pH-controlling agent is an industrial waste containing a metal oxide or metal hydroxide, or an ore.

7. A process as set forth in claim 6, wherein said pH-controlling agent is a sludge from plating industries.

8. A process as set forth in claim 1, wherein said pH-controlling agent is added in an amount so that the pH of said liquid phase becomes in the range of between about 1.5 and about 3.

9. A process as set forth in claim 1, wherein said mixture is maintained at a temperature of 50° to 100° C. under stirring before step (d).

10. A process as set forth in claim 1, further comprising subjecting said liquid phase from step (d) to the treatment of steps (a) to (d).

11. A process as set forth in claim 1, further comprising treating said organic phase from step (b) with hydrochloric acid to remove the ferric component therefrom and to regenerate same and recycling said regenerated organic phase to step (a) for use as said extractant.

* * * * *